(12) United States Patent
Chisholm et al.

(10) Patent No.: US 6,300,405 B2
(45) Date of Patent: *Oct. 9, 2001

(54) POLYESTER MOLDING COMPOSITION

(75) Inventors: Bret J. Chisholm, Mt. Vernon, IN (US); William D. Richards, Scotia, NY (US)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,877

(22) Filed: Jun. 30, 1998

(51) Int. Cl.$^7$ .......................... C08K 3/40; C08G 63/688; C08L 5/02
(52) U.S. Cl. ......................... 524/494; 524/464; 524/603
(58) Field of Search ................................. 524/603, 464, 524/494; 528/295

(56) References Cited

U.S. PATENT DOCUMENTS

| | | |
|---|---|---|
| 2,465,319 | 3/1949 | Whinfield et al. . |
| 3,018,272 | 1/1962 | Griffing et al. . |
| 3,047,539 | 7/1962 | Pengilly . |
| 3,546,008 | 12/1970 | Shields et al. . |
| 4,122,061 | 10/1978 | Holub et al. . |
| 4,217,441 * | 8/1980 | Bayless ................................. 528/295 |
| 4,493,872 | 1/1985 | Funderburk et al. . |
| 4,554,328 | 11/1985 | Sinker et al. . |
| 4,636,544 | 1/1987 | Hepp . |
| 5,300,572 * | 4/1994 | Tajima et al. ........................ 528/295 |
| 5,441,997 | 8/1995 | Walsh et al. . |
| 5,443,783 * | 8/1995 | Shepherd et al. . |
| 5,563,236 | 10/1996 | Murata et al. . |

FOREIGN PATENT DOCUMENTS

| | | |
|---|---|---|
| 0076226 * | 4/1983 | (EP) . |
| 19850200759 | 3/1987 | (JP) . |
| 4028726 * | 1/1992 | (JP) . |
| 93/07199 * | 4/1993 | (WO) . |

* cited by examiner

*Primary Examiner*—Tae H. Yoon

(57) ABSTRACT

A thermoplastic resin composition comprising:

(a) Alkylene aryl polyester copolymers having metal sulfonate units represented by the formula IA:

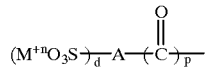

or the formula IB:

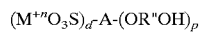

where p=1–3, d=1–3, p+d=2–6, n=1–5, and A is an aryl group containing one or more aromatic rings where the sulfonate substituent is directly attached to an aryl ring, R" is a divalent alkyl group and the metal sulfonate group is bound to the polyester through ester linkages;

(b) glass fibers.

20 Claims, 1 Drawing Sheet

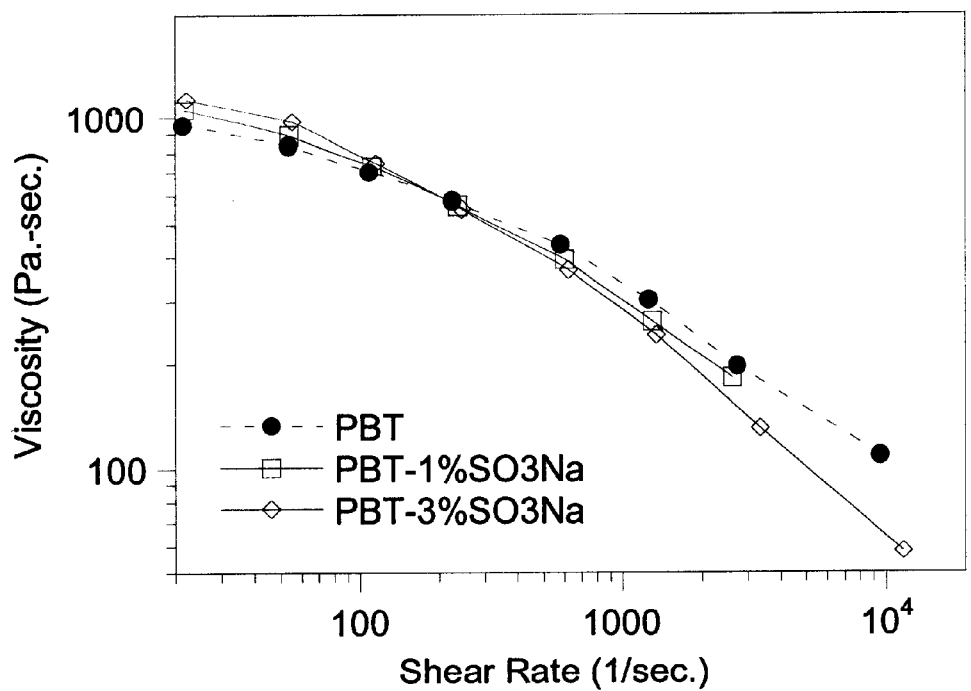
Figure 1. Viscosity as a function of shear rate at 250°C for the materials described in Table I.

POLYESTER MOLDING COMPOSITION

FIELD OF THE INVENTION

The invention relates to a molding composition comprising a polyester resin with a filler material.

BACKGROUND OF THE INVENTION

For thermoplastic polyester resins, the fibrous glass enhances the mechanical properties of the resin. Glass filled crystalline resin blends are difficult to mold due to a combination of poor mold flow and shear sensitivity. Lack of these properties make thin wall molding such as may be desired with blow molding, injection molding and extrusion molding techniques difficult to achieve. The crystalline resin has poor melt strength and high shrinkage upon cooling. This makes it difficult to obtain good dimensional tolerances. Typically, extruded blends also have a very rough surface.

Unfortunately, in such resins, the addition of glass fibers can substantially lower the Izod impact strengths of the fiber reinforced compositions, and, also, substantially reduce the biaxial impact (instrument impact) energies of such compositions.

Holub et al, U.S. Pat. No. 4,122,061 describes polyester reinforced blends of poly(1,4-butylene terephthalate) and poly(ethylene terephthalate) impact modified with the addition of a polyolefin or olefin based copolymer resin. The polyolefinic resin is dispersed into the polyester blend and used for injection molding. Workpieces molded from such polyester resins are described as having a high degree of surface hardness and abrasion resistance, high gloss, and lower surface friction. It is desirable to provide further enhancements to the properties of resins of the type described in Holub et al.

U.S. Pat. No. 5,441,997 describes polyester molding compositions which have ceramic like qualities, can be molded into relatively thin sections, and have high impact strength. The composition is directed to a polybutylene terephthalate and/or polyethylene terephthalate and an aromatic polycarbonate with inorganic fillers selected from the group consisting of barium sulfate, strontium sulfate, zirconium oxide and zinc sulfate. If desired, a styrene rubber impact modifier is described as an added to the composition as well as a fibrous glass reinforcing filler. Although these Ecompositions are suited for applications where ceramic like qualities are desired, compositions for profile type extrusions are having different property balance is desirable.

The prior art focus is to add various ingredients to enhance the properties of the polyester material. However, with this approach, it is difficult to achieve the desired improvement in properties. The addition of one ingredient may improve one property but result in the degradation of another desirable property. As a result, a combination of various ingredients are added which further complicates the production of a consistent product due to the interactions of the various ingredients with one another.

As an example of an additive used to improve properties, it is known to add impact modifiers to polyester resins to improve the ductility or the notched Izod impact strength thereof. However the effect of such impact modifiers on reinforcing polyester resin compositions, such as those containing 30% by weight of reinforcing glass fibers, is a relatively modest improvement in ductility and, unfortunately, an increase in the melt viscosity or reduction in the melt flow, modulus and heat distortion properties of the composition.

One problem with polyesters in injection molding applications is that it is sometimes difficult to fill large molds requiring long flow lengths or very thin parts because of the high melt viscosity of the polymer. A solution to this problem is to raise the temperature of the polymer melt, thus lowering its viscosity. This solution is often not satisfactory for polyester polymers since polyesters tend to degrade, or lose molecular weight, at elevated processing temperatures.

Also, there are other well known additives which reduce the melt viscosity of polyesters. However, these additives usually make the resulting molded material less rigid, less heat resistant, and/or function only by breaking down the molecular weight of the polyester resulting in reduced impact.

Accordingly, there is a need for a more simple glass reinforced polyester resin compositions which exhibit consistent and uniform properties together with enhanced properties of improve mold flow, increase shear sensitivity, increase tensile strength, and increase flexual modulus in glass filled material.

SUMMARY OF THE INVENTION

We have found that modification of a polyester resin with a small amount of a metal sulfonate salt gives glass filled blends that have surprisingly improved mold flow, increase shear sensitivity, increase tensile strength, and increase flexual modulus as compared to a polyester resin absent the metal sulfonate. These blends still have high impact strength, good stiffness and mechanical properties along with good appearance and proccessability.

We have also found that use of the metal sulfonate polyester copolymer modifies the rheology of the blends especially under low shear where the melt strength is enhanced. Enhanced melt strength is very beneficial in facilitating processing under low shear condition like blow molding and extrusion, it may also be useful for enhanced thermoformability.

In accordance with the present invention, there is provided a thermoplastic resin composition having enhanced shear sensitivity consisting essentially of an:

(a) Alkylene aryl polyester copolymers having metal sulfonate units represented by the formula IA:

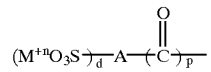

or the formula IB:

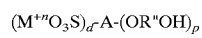

where p=1–3, d=1–3, p+d=2–6, n=1–5, M is a metal, and A is an aryl group containing one or more aromatic rings where the sulfonate substituent is directly attached to an aryl ring, R" is a divalent alkyl group and the metal sulfonate group is bound to the polyester through ester linkages;

(b) a glass fiber.

According to the preferred embodiments, a functional sulfonate salt "ionomer" group is incorporated into the polyester so that a blend of polyester ionomer and glass fiber has improved properties as compared to blends not utilizing the polyester ionomer.

According to other embodiments, the above polyester may have addition ingredients such as: other resins, fillers, reinforcements, stabilizers, flame retardants and rubbery impact modifiers.

BRIEF DESCRIPTION OF THE DRAWINGS

FIG. 1 is a graph of Viscosity as a function of shear rate at 250° C. for the materials described in Table I.

DETAILED DESCRIPTION OF PREFERRED EMBODIMENTS

The term polyester ionomer, or sulfonate polyester or metal sulfonate polyester, refers to polyester polymers derived from the reaction residue of an aryl carboxylic sulfonate salt, an aromatic dicarboxylic acid, an aliphatic diol or any of their ester forming derivatives. The ionomer polyester polymers comprise some monovalent and/or divalent sulfonate salt units represented by the formula IA:

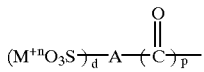

or formula IB:

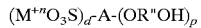

wherein p=1–3; d=1–3, and p+d=2–6, and A is an aryl group containing one or more aromatic rings: for example, benzene, naphthalene, anthracene, biphenyl, terphenyl, oxy diphenyl, sulfonyl diphenyl or alkyl diphenyl, where the sulfonate substituent is directly attached to an aryl ring. These groups are incorporated into the polyester through carboxylic ester linkages. The aryl groups may contain one or more sulfonate substituents; d=1–3 and may have one or more carboxylic acid linkages; p=1–3. Groups with one sulfonate substituent (d=1) and two carboxylic linkages (p=2) are preferred. M is a metal, n=1–5. Preferred metals are alkaline or alkaline earth metals where n=1–2. Zinc and tin are also preferred metals. R" is a alkyl group, for example, —CH$_2$CH$_2$—, —CH$_2$CH$_2$OCH$_2$CH$_2$—, —CH(CH$_3$)CH$_2$—, CH$_2$CH$_2$CH$_2$—, —CH$_2$CH$_2$CH$_2$CH$_2$—.

Typical sulfonate substituents that can be incorporated into the metal sulfonate polyester copolymer may be derived from the following carboxylic acids or their ester forming derivatives; sodium sulforisophthalic acid, potassium sulfo terephthalic acid, sodium sulfo naphthalene dicarboxylic acid, calcium sulfo isophthalate, potassium 4,4'-di (carbomethoxy) biphenyl sulfonate, lithium 3,5-di (carbomethoxy)benzene sulfonate, sodium p-carbomethoxy benzene sulfonate, dipotassium 5-carbomethoxy-1,3-disulfonate, sodio 4-sulfo naphthalene-2,7-dicarboxylic acid, 4-lithio sulfophenyl-3,5-dicarboxy benzene sulfonate, 6sodiosulfo-2-naphthyl-3,5-dicarbomethoxy benzene sulfonate and dimethyl 5-[4-(sodiosulfo) phenoxy] isophthalate. Other suitable sulfonate carboxylic acids and their ester forming derivatives are described in U.S. Pat. Nos. 3,018,272 and 3,546,008. The most preferred sulfonate polyesters are derived from sodium 3,5-dicarbomethoxy benzene sulfonate.

Preferred ionomer polyester polymer comprises divalent ionomer units represented by the formula III:

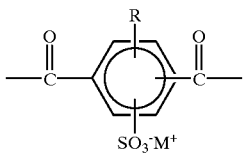

wherein R is hydrogen, halogen, alkyl or aryl, and M is a metal.

The most preferred polyester ionomer has the formula IV:

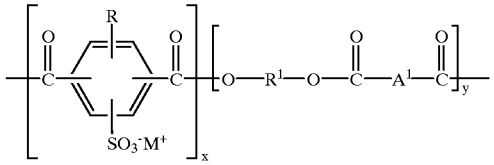

where the ionomer units, x, are from 0.1–50 mole percent of the polymer with 0.5 to 10 mole percent being preferred. Most preferably, R is hydrogen. When R is hydrogen, A$^1$ is phenylene and R$^1$ is an alkylene radical of from C$^1$ to C$^{12}$, preferably from C$^1$ to C$^4$, and x and y are in mole percent then s is from about 1 to about 20 percent, and more preferably from about 2 to about 15 percent, and most preferably from about 3 to about 12 percent.

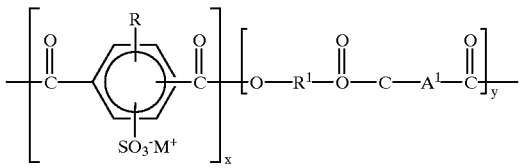

Typical glycol or diol reactants, R$^1$, include straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. A preferred cycloaliphatic diol is 1,4-cyclohexane dimethanol or its chemical equivalent. When cycloaliphatic diols are used as the diol component, a mixture of cis- to trans-isomers may be used, it is preferred to have a trans isomer content of 70% or more. Chemical equivalents to the diols include esters, such as dialkyl esters, diaryl esters and the like.

Examples of aromatic dicarboxylic acid reactants, as represented by the decarboxylated residue A$^1$, are isophthalic or terephthalic acid, 1,2-di(p-carboxyphenyl)ethane, 4,4'-dicarboxydiphenyl ether, 4,4'-bisbenzoic acid and mixtures thereof. All of these acids contain at least one aromatic nucleus. Acids containing fused rings can also be present, such as in 1,4- 1,5- or 2,6-naphthalene dicarboxylic acids. The preferred dicarboxylic acids are terephthalic acid, isophthalic acid or mixtures thereof.

The most preferred ionomer polyesters are poly(ethylene terephthalate) (PET) ionomers, and poly(1,4-butylene terephthalate) ionomers, (PBI), and (polypropylene terephthalate) (PPI) ionomers.

Also contemplated herein are the above polyester ionomers with minor amounts, e.g., from about 0.5 to about 15 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) ionomer resin used in this invention is one obtained by polymerizing an ionomer component comprising a dimethyl 5-sodium sulfo-1,3-phenylenedicarboxylate, from 1 to 10 mole %, a glycol component of at least 70 mole %, preferably at least 90 mole %, of tetramethylene glycol and an acid component of at least 70 mole %, preferably at least 90 mole %, of terephthalic acid, and polyester-forming derivatives therefore.

The glycol component should contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol.

The acid component should contain not more than 30 mole %, preferably not more than 20 mole %, of another acid such as isophthalic acid, 2,6-naphthalene dicarboxylic acid, 1,5-naphthalene dicarboxylic acid, 4,4'-diphenyldicarboxylic acid, 4,4'-diphenoxyethane dicarboxylic acid, p-hydroxy benzoic acid, sebacic acid, adipic acid and polyester-forming derivatives thereof.

It is also possible to use a branched polyester ionomers in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl end groups on the polyester, depending on the ultimate end-use of the composition.

In some instances, it is desirable to reduce the number of acid end groups, typically to less than about 30 micro equivalents per gram, with the use of acid reactive species. In other instances, it is desirable that the polyester has a relatively high carboxylic end group concentration.

Blends of polyesters ionomers with non sulfonate salt polyesters may also be employed as the polyester ionomer composition. For example the invention may consist of a blend of sulfonate salt PBT and the PBT ionomer resin. Preferred non sulfonate salt polyesters are the alkylene phthalate polyesters The present molding compositions are reinforced or stiffened by the inclusion of a fibrous glass or carbon filler, preferably glass fibers, in amounts ranging from about 3% to 50% by weight of the total composition, preferably from about 7% to about 45%, more preferably from about 10% to about 40%.

The glass fiber or filamentous glass employed as reinforcement in the present compositions, preferably comprise lime-aluminum borosilicate glass that is relatively soda-free. The filaments are made by standard processes, e.g., by steam or air blowing, flame blowing and mechanical pulling. For compositions ultimately to be employed for electrical uses, it is preferred to use fibrous glass filaments comprised of borosilicate glass that is relatively soda-free. This is known as "E" glass. The filaments are made by standard processes, e.g., by steam or air blowing, flame blowing and mechanical pulling.

The preferred filaments for plastic reinforcement are made by mechanical pulling. The filament diameters range from about 3 to 30 microns but this is not critical to the present invention. The filament diameters preferably range from about 3–20 microns, but this is not critical to the present invention. Use of non round fiber cross section is also possible.

The length of the glass filaments and whether or not they are bundled into fibers and the fibers bundled in turn into yarns, ropes or rovings, or woven into mats and the like are also not critical to the invention. In preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125 (⅛").

The molding compositions include from about 50 to about 97%, preferably from about 50% to about 90% by weight alkylene aryl polyester copolymers, or most preferably from about 60% to about 90% by weight weight alkylene aryl polyester copolymers. Preferred compositions comprise glass contents are at levels of from 10 percent to about 40 percent by weight and consist essentially of polyester and glass.

Additionally, it may be desired to employ inorganic fillers to the thermoplastic resin provided the favorable properties are not deleteriously effected. Typical inorganic fillers include: alumina, amorphous silica, anhydrous alumino silicates, mica, feldspar, clays, talc, glass microspheres, metal oxides such as titanium dioxide, zinc sulfide, ground quartz, and the like. Some inorganic fillers may provide a ceramic-like feel to articles formed from the resin composition.

The composition of the present invention may include additional components which do not interfere with the previously mentioned desirable properties but enhance other favorable properties.

Flame-retardant additives are desirably present in an amount at least sufficient to reduce the flammability of the polyester resin, preferably to a UL94 V-0 rating The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly haloaryl acrylate), poly (haloaryl methacrylate), or mixtures thereof. Poly (haloaryl acrylate) is preferred with the most preferably being poly (pentabromobenzyl acrylate). PBB-PA has been known for some time, and is a valuable flame-retardant material, useful in a number of synthetic resins. PBB-PA is prepared by the polymerization of pentabromobenzyl acrylate ester (PBBMA). The PBB-PA polymeric flame-retardant material is incorporated into the synthetic resin during processing to impart flame retardant characteristics.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. Nos. 4,636,544 to Hepp.

The flame retardants are typically used with a synergist, particularily inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Also, the final composition may contain polytetrafluoroethylene (PTFE) type resins or copolymers used to reduce dripping in flame retardant thermoplastics.

The composition may optionally contain impact modifiers such as a rubbery impact modifier. Preferably such impact modifiers are utilized in an amount less than about 30%, and preferably from 1 to 25% by weight, more preferably less than about 20 percent, even more preferably less than about 15 percent by weight based on the total weight of the composition. Typical impact modifiers are derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials showing elasticity at room temperature. They include both homopolymers and copolymers, including random, block, radial block, graft and core-shell copolymers as well as combinations thereof. Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth) acrylate. The core and/or the shell(s) often comprise multifunctional compounds which may act as a crosslinking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate. Other higher olefin monomers can be employed in copolymers with alkyl acrylates, for example, propylene and n-butyl acrylate. The olefin diene terpolymers are well known in the art and generally fall into the EPDM (ethylene propylene diene) family of terpolymers. Polyolefins such as polyethylene, especially low density polyethylene (LDPE), and polyethylene copolymers with alpha olefins are also of use in these compositions. Polyolefin copolymers with glycidyl acrylates or methacrylates may be especially effective in the impact modification of polyester containing blends. Terpolymers of ethylene with alkyl acrylates or methacrylates and glycidyl methacrylates may be especially preferred.

Styrene-containing polymers can also be used as impact modifiers. Examples of such polymers are acrylonitrilbbutadiene-styrene (ABS), acrylonitrile-butadiene-alpha-methylstyrene, styrene-butadiene, styrene butadiene styrene (SBS), styrene ethylene butylene styrene (SEBS), methacrylate-butadiene-styrene (MBS), and other high impact styrene-containing polymers.

The blends of this invention can be processed by various techniques including injection molding, blow molding, extrusion into sheet, film or profiles, compression molding and etc. They can also be formed into a variety of articles for use in, for example; electrical connectors, electrical devices, computers, building and construction, outdoor equipment, trucks and automobiles.

EXAMPLES

The following examples illustrate the present invention, but are not meant to be limitations to the scope thereof.

The ingredients of the examples shown in the tables below were tumble blended and then extruded on a 2.5 inch HPM single screw extruder with a vacuum vented, double-wave screw, 30:1 L/D, at a barrel and die head temperature between 490 and 510 degrees F and 100 rpm screw speed. The extrudate was cooled through a water bath prior to pelletizing. Test parts were injection molded on a van Dom molding machine with a set temperature of approximately 500 to 510° F. The pellets were dried for 3–4 hours at 250° F. in a forced air circulating oven prior to injection molding.

Mechanical properties were tested as follows: unnotched Izod (UNI), ASTM D256; heat distortion temperature (HDT) at 66 and 264 psi, ASTM D648; tensile strength (T.S.), ASTM D638; flexural strength (F.S.) and flexural modulus (F.M.), ASTM D790.

Melt Viscosity (MV) was measured at 250° C. using a Tinius Olsen model UE-4-78 rheometer, a weight of 5,000 g, and an orifice with a 0.0825 inch diameter. This set of conditions results in a shear rate of approximately $100s^{-1}$.

Viscosity—shear rates profiles were obtained at 250° C. using a Goettfert rheometer and shear sensitivity was quantified as the ratio of the viscosity measured at a low shear rate ($\sim 50s^{-1}$) to the viscosity measured at a high shear rate ($\sim 11,000s^{-1}$). The higher this ratio, the more shear sensitive the material.

Ash content was measured according to ASTM method D5630.

Flow length was determined using a spiral flow mold with a channel depth of 0.030 inches and a Van Dorn 110 ton molding machine. Conditions used for the measurements were: barrel temperature, 480° F.; mold temperature, 150° F.; injection pressure, 1500 psi; injection speed, 3.0 in./sec.; injection time, 6.0 sec.; cycle time, 30.0 sec.

TABLE I

Description of Raw Materials.

| Raw Material | Description |
| --- | --- |
| PBT | Polybutylene terephthalate from GE Plastics |
| PBT-1% SO3Na | Shown in Formula I with x = 0.01 |
| PBT-1.5% SO3Na | Shown in Formula I with x = 0.015 |
| PBT-3% SO3Na | Shown in Formula I with x = 0.03 |
| PBT-5% SO3Na | Shown in Formula I with x = 0.05 |
| Glass Fiber | OCF 183F from Owens-Corning, 14.0 μm short glass fiber, and 10 micron short fiber |
| LLDPE | Escorene LL-5102.9 from Exxon Chemicals, linear low density polyethylene |
| EEA | EEA NUC6570 ethylene-ethylacrylate copolymer |

TABLE I-continued

Description of Raw Materials.

| Raw Material | Description |
|---|---|
| Hytrel | Hytrel 4056 from DuPont Company, polyester polyether elastomer |
| FR Concentrate | 67% Brominated polycarbonate BC 58 from Great Lakes Chemical<br>20% Antimony trioxide<br>13% Ethyl vinyl acetate |
| Kraton | Kraton G1651 from Shell Chemical, styrene-ethylene/butylene-styrene elastomer |
| MBS | EXL 3691 from Rohm & Haas, butadiene-based core-shell impact modifier |
| Irganox 1076 | Hindered phenol antioxidant from Ciba-Geigy |
| PTFE | 50% fibular polytetrafluorethylene, 50% SAN (styrene-acrylonitrile) |
| PEPQ | Phosphite antioxidant from Sandoz Chemical Corp. |

Formula I. Chemical structure of sulfonated PBT.

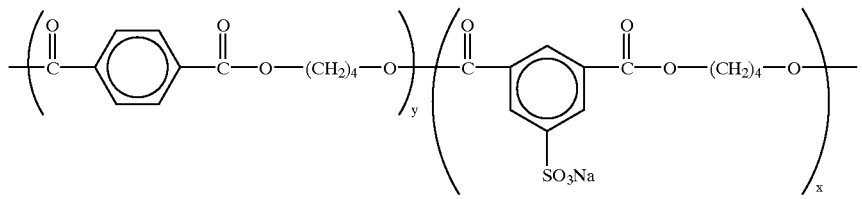

The PBT-ionomers used in the examples to follow were produced by the melt polymerization of dimethylterephthalate (DMI), dimethyl-5-sodiosulfo-1,3-phenylene dicarboxylate (DMSIP), and 1,4-butanediol (BD) using tetraisopropyl titanate (IH) as a catalyst. For example, a PBT-ionomer containing 5.0 mole percent sulfonate (PBT-5%SO3Na) was produced by adding 123.3 lbs of DMT, 9.90 lbs. of DMSIP, 100.1 lbs. of BD, and 43 mls. of TPT to a 40CV Helicone reactor which was preheated to 130° C. The monomer mixture was then heated to 225° C. at a rate of 1.5° C./minute under atmospheric pressure and most of the methanol by-product removed by distillation. The mixture was then subjected to a gradual reduction in pressure at a rate of 20 mm Hg/minute while the temperature was simultaneously increased to 250° C. at a rate of 1.5° C./minute. The total time under vacuum was 68 minutes. This polymerization produced a PBT-ionomer with a melt viscosity at 250° C. and shear rate of about $100s^{-1}$ of about 9,000 poise.

Entries in each of the tables to follow represents a single experiment. Thus, for each example in a given table, the extrusion conditions, molding conditions, testing conditions, etc. were identical. The materials designated "R1", "R2", etc. are reference materials while materials designated "E1", "E2", etc. are examples of the invention.

In general, the examples show that the shear sensitivity of PBT-ionomer-containing materials are significantly higher than PBT-based materials of similar MV. Shear sensitivity increases by greater than ten percent, preferably greater than twenty percent and more preferably greater than thirty percent The higher shear sensitivity results in greater flow lengths as demonstrated using spiral flow measurements (see Tables II–VI). Shear sensitivity and flow length were found to increase with increasing sulfonate content over the range of sulfonate contents investigated. In addition, most of the materials based on PBT-ionomer showed increased tensile strength, flexural modulus, and flexural strength than analogous PBT-based materials (see Tables II and Tables V–XI). The ability to improve flow, tensile strength, flexural modulus, and flexural strength of glass-filled material by incorporating sulfonate groups into PBT was quite unexpected.

TABLE II

Properties of 30% glass-filled PBT-ionomers.

| | R1 | E1 | E2 |
|---|---|---|---|
| PBT, 8500 poise | 54.78 | — | — |
| PBT, 700 poise | 15.00 | — | — |
| PBT-1% SO3Na, 7,860 poise | — | 69.78 | — |
| PBT-3% SO3Na, 6,320 poise | — | — | 69.78 |
| Glass Fiber | 30.00 | 30.00 | 30.00 |
| Irganox 1076 | 0.11 | 0.11 | 0.11 |
| PEPQ | 0.11 | 0.11 | 0.11 |
| Shear Sensitivity | see FIG. 1 | see FIG. 1 | see FIG. 1 |
| Spiral Flow @ 30 mil (in.) | 2.25 | 2.75 | 3.25 |
| UNI (ft. lb./in.) | 14.5 | 14.7 | 13.7 |
| T.S. (psi) | 17,090 | 18,360 | 18,640 |
| F.M. (psi) | 918,600 | 987,400 | 961,000 |
| F.S. (psi) | 25,090 | 26,660 | 26,380 |
| HDT, 264 psi (C) | 197 | 201 | 194 |
| HDT, 66 psi (C) | 220 | 219 | 215 |

TABLE III

Properties of 30% glass-filled PBT-ionomers as a function of sulfonate content.

| | R2 | E3 | E4 | E5 |
|---|---|---|---|---|
| PBT, 8500 poise | 35.38 | — | — | — |
| PBT, 700 poise | 34.52 | — | — | — |
| PBT-1% SO3Na, 6,848 poise | — | 6.09 | — | — |
| PBT-3% SO3Na, 7,272 poise | — | — | 15.62 | — |
| PBT-5% SO3Na, 7,047 poise | — | — | — | 15.08 |
| PBT-1% SO3Na, 2,247 poise | — | 63.81 | — | — |
| PBT-3% SO3Na, 1,816 poise | — | — | 54.28 | — |
| PBT-5% SO3Na, 1,857 poise | — | — | — | 54.82 |
| Glass Fiber | 30.00 | 30.00 | 30.00 | 30.00 |
| Irganox 1076 | 0.10 | 0.10 | 0.10 | 0.10 |
| Vis. @ low shear (Pa.-sec.) | 516 @ 55 $s^{-1}$ | 552 @ 58 $s^{-1}$ | 600 @ 57 $s^{-1}$ | 651 @ 58 $s^{-1}$ |
| Vis. @ high shear (Pa.-sec.) | 61 @ 10,195 $s^{-1}$ | 49 @ 10,928 $s^{-1}$ | 44 @ 11,494 $s^{-1}$ | 44 @ 11,799 $s^{-1}$ |
| Shear Sensitivity | 8.5 | 11.3 | 13.6 | 14.8 |
| MV (poise) | 7,186 | 6,820 | 8,003 | 8,386 |
| Spiral Flow @ 30 mil(in.) | 2.75 | 3.125 | 3.375 | 3.50 |
| UNI (ft. lb./in.) | 13.85 | 13.65 | 11.97 | 11.43 |
| T.S. (psi) | 18,470 | 19,440 | 18,970 | 16,140 |
| F.M. (psi) | 996,800 | 1,030,000 | 1,030,000 | 1,034,000 |
| F.S. (psi) | 26,970 | 27,980 | 27,180 | 24,640 |
| HDT, 264 psi (C) | 192 | 192 | 184 | 162 |
| HDT, 66 psi (C) | 218 | 215 | 211 | 202 |

TABLE IV

Properties of 33% glass-filled PBT-ionomers with 5.0 wt. % LLDPE.

| | R3 | E6 | E7 | E8 |
|---|---|---|---|---|
| PBT, 8500 poise | 31.32 | — | — | — |
| PBT, 700 poise | 30.48 | — | — | — |
| PBT-1% SO3Na, 6,848 poise | — | 5.49 | — | — |
| PBT-3% SO3Na, 7,272 poise | — | — | 13.89 | — |
| PBT-5% SO3Na, 7,047 poise | — | — | — | 13.42 |
| PBT-1% SO3Na, 2,247 poise | — | 56.31 | — | — |
| PBT-3% SO3Na, 1,816 poise | — | — | 47.91 | — |
| PBT-5% SO3Na, 1,857 poise | — | — | — | 48.38 |
| Glass Fiber | 33 | 33 | 33 | 33 |
| LLDPE | 5 | 5 | 5 | 5 |
| Irganox 1010 | 0.20 | 0.20 | 0.20 | 0.20 |
| Vis. @ low shear (Pa.-sec.) | 557 @ 58 $s^{-1}$ | 561 @ 60 $s^{-1}$ | 649 @ 60 $s^{-1}$ | 687 @ 59 $s^{-1}$ |
| Vis. @ high shear (Pa.-sec.) | 49 @ 10,583 $s^{-1}$ | 38 @ 11,367 $s^{-1}$ | 36 @ 11,917 $s^{-1}$ | 35 @ 12,187 $s^{-1}$ |
| Shear Sensitivity* | 11.4 | 14.8 | 18.0 | 19.6 |
| MV (poise) | 7,978 | 7,321 | 8,220 | 8,600 |
| Spiral Flow @ 30 mil(in.) | 3.0 | 3.5 | 3.75 | 4.0 |
| UNI (ft. lb./in.) | 14.46 | 16.55 | 14.96 | 15.56 |
| T.S. (psi) | 17,170 | 17,980 | 19,040 | 17,970 |
| F.M. (psi) | 1,024,000 | 1,027,000 | 1,053,000 | 1,067,000 |
| F.S. (psi) | 25,820 | 26,430 | 26,650 | 25,740 |
| HDT, 264 psi (C) | 194 | 193 | 185 | 170 |
| HDT, 66 psi (C) | 217 | 217 | 211 | 203 |

TABLE V

Properties of 30% glass-filled PBT-ionomers with different glass fibers.

| | R4 | E9 | R5 | E10 | R6 | E11 |
|---|---|---|---|---|---|---|
| PBT, 8500 poise | 35.33 | — | 35.33 | — | 35.33 | — |
| PBT, 700 poise | 34.47 | — | 34.47 | — | 34.47 | — |
| PBT-3% SO3Na, 6,643 poise | — | 16.48 | — | 16.48 | — | 16.48 |
| PBT-3% SO3Na, 1,826 poise | — | 53.32 | — | 53.32 | — | 53.32 |
| Glass Fiber OCF 183F 10C | 30.00 | 30.00 | — | — | — | — |

TABLE V-continued

Properties of 30% glass-filled PBT-ionomers with different glass fibers.

|  | R4 | E9 | R5 | E10 | R6 | E11 |
|---|---|---|---|---|---|---|
| Glass Fiber PPG 3660 | — | — | 30.00 | 30.00 | — | — |
| Glass Fiber OC 123D 10C | — | — | — | — | 30.00 | 30.00 |
| Irganox 1010 | 0.20 | 0.20 | 0.20 | 0.20 | 0.20 | 0.20 |
| Vis. @ low shear (Pa.-sec.) | 537 @ 53 $s^{-1}$ | 519 @ 53 $s^{-1}$ | 598 @ 53 $s^{-1}$ | 587 @ 54 $s^{-1}$ | 526 @ 53 $s^{-1}$ | 519 @ 53 $s^{-1}$ |
| Vis. @ high shear (Pa.-sec.) | 70 @ 9801 $s^{-1}$ | 45 @ 11024 $s^{-1}$ | 75 @ 11032 $s^{-1}$ | 45 @ 11319 $s^{-1}$ | 70 @ 9798 $s^{-1}$ | 44 @ 11126 $s^{-1}$ |
| Shear Sensitivity* | 7.7 | 11.5 | 8.0 | 13.0 | 7.5 | 11.8 |
| MV (poise) | 9,153 | 8,699 | 9,653 | 9,817 | 8,852 | 9,071 |
| Spiral Flow @ 30 mil (in.) | 4.25 | 5.125 | 4.00 | 5.25 | 4.25 | 5.00 |
| UNI (ft. lb./in.) | 16.03 | 16.27 | 15.93 | 16.25 | 15.23 | 17.83 |
| T.S. (psi) | 17,940 | 18,900 | 17,620 | 18,290 | 17,100 | 17,950 |
| F.M. (psi) | 1,000,000 | 1,052,000 | 975,400 | 1,080,000 | 1,031,000 | 1,058,000 |
| F.S. (psi) | 27,550 | 28,470 | 27,070 | 29,160 | 26,500 | 29,260 |
| HDT, 264 psi (C) | 197 | 191 | 197 | 191 | 199 | 193 |

TABLE VI

Properties of 30% glass-filled PBT-ionomers with different glass fibers.

|  | R7 | E12 | R8 | E13 | R9 | E14 |
|---|---|---|---|---|---|---|
| PBT, 8500 poise | 35.33 | — | 35.33 | — | 35.33 | — |
| PBT, 700 poise | 34.47 | — | 34.47 | — | 34.47 | — |
| PBT-3% SO3Na, 6,643 poise | — | 16.48 | — | 16.48 | — | 16.48 |
| PBT-3% SO3Na, 1,826 poise | — | 53.32 | — | 53.32 | — | 53.32 |
| Glass Fiber OC 127C 10C | 30.00 | 30.00 | — | — | — | — |
| Glass Fiber OC R17BX1 | — | — | 30.00 | 30.00 | — | — |
| Glass Fiber OC 173X 10C | — | — | — | — | 30.00 | 30.00 |
| Irganox 1010 | 0.20 | 0.20 | 0.20 | 0.20 | 0.20 | 0.20 |
| Vis. @ low shear (Pa.-sec.) | 566 @ 53 $s^{-1}$ | 558 @ 54 $s^{-1}$ | 648 @ 54 $s^{-1}$ | 558 @ 54 $s^{-1}$ | 759 @ 53 $s^{-1}$ | 548 @ 54 $s^{-1}$ |
| Vis. @ high shear (Pa.-sec.) | 75 @ 9745 $s^{-1}$ | 44 @ 11310 $s^{-1}$ | 61 @ 10186 $s^{-1}$ | 45 @ 11174 $s^{-1}$ | 98 @ 9554 $s^{-1}$ | 45 @ 11146 $s^{-1}$ |
| Shear Sensitivity* | 7.5 | 12.7 | 10.6 | 12.4 | 7.7 | 12.2 |
| MV (poise) | 9133 | 8480 | 10557 | 8710 | 13359 | 9037 |
| Spiral Flow @ 30 mil (in.) | 4.00 | 4.00 | 4.00 | 5.125 | 3.75 | 5.00 |
| UNI (ft. lb./in.) | 14.7 | 16.26 | 18.91 | 19.28 | 12.44 | 16.59 |
| T.S. (psi) | 16530 | 18010 | 17870 | 16960 | 15480 | 16240 |
| F.M. (psi) | 959700 | 1047000 | 992300 | 1082000 | 944600 | 1049000 |
| F.S. (psi) | 24862 | 27970 | 27490 | 29610 | 23640 | 27470 |
| HDT, 264 psi (C) | 196 | 190 | 198 | 191 | 197 | 188 |

TABLE VII

Properties of 30% glass-filled PBT-ionomers containing EEA.

|  | R10 | E15 | E16 | E17 | E18 |
|---|---|---|---|---|---|
| PBT, 8500 poise | 32.80 | — | — | — | — |
| PBT, 700 poise | 32.00 | — | — | — | — |
| PBT-1.5% SO3Na, 7,647 poise | — | 14.63 | 15.083 | — | — |
| PBT-1.5% SO3Na, 1,783 poise | — | 50.17 | 51.72 | — | — |
| PBT-3% SO3Na, 7,507 poise | — | — | — | 16.34 | 15.85 |
| PBT-3% SO3Na, 1,730 poise | — | — | — | 50.46 | 48.95 |
| Glass Fiber | 30.00 | 30.00 | 30.00 | 30.00 | 30.00 |
| EEA | 5.00 | 5.00 | 3.00 | 3.00 | 5.00 |
| Irganox 1010 | 0.20 | 0.20 | 0.20 | 0.20 | 0.20 |
| Vis. @ low shear (Pa.-sec.) | 378 @ 112 $s^{-1}$ | 397 @ 109 $s^{-1}$ | 410 @ 107 $s^{-1}$ | 428 @ 108 $s^{-1}$ | 391 @ 111 $s^{-1}$ |
| Vis. @ high shear (Pa.-sec.) | 56 @ 10,082 $s^{-1}$ | 39 @ 11,053 $s^{-1}$ | 43 @ 10,915 $s^{-1}$ | 40 @ 11,236 $s^{-1}$ | 36 @ 11,164 $s^{-1}$ |
| Shear Sensitivity | 6.75 | 10.2 | 9.5 | 10.7 | 10.9 |
| MV (poise) | 8,457 | 7,647 | 7,754 | 7,700 | 7,743 |
| UNI (ft. lb./in.) | 15.4 | 16.0 | 15.4 | 14.8 | 15.0 |
| T.S. (psi) | 14,580 | 16,170 | 16,680 | 17,027 | 16,335 |

TABLE VII-continued

Properties of 30% glass-filled PBT-ionomers containing EEA.

|  | R10 | E15 | E16 | E17 | E18 |
|---|---|---|---|---|---|
| F.M. (psi) | 845,700 | 933,600 | 996,400 | 973,000 | 962,600 |
| F.S. (psi) | 23,200 | 24,990 | 26,690 | 26,210 | 25,460 |
| HDT, 264 psi (C) | 193 | 193 | 195 | 188 | 184 |

TABLE VIII

Properties of 30% glass-filled PBT-ionomers containing Hytrel.

|  | R11 | E19 | E20 | E21 | E22 |
|---|---|---|---|---|---|
| PBT, 8500 poise | 32.80 | — | — | — | — |
| PBT, 700 poise | 32.00 | — | — | — | — |
| PBT-1.5% SO3Na, 7,647 poise | — | 14.63 | 15.083 | — | — |
| PBT-1.5% SO3Na, 1,783 poise | — | 50.17 | 51.72 | — | — |
| PBT-3% SO3Na, 7,507 poise | — | — | — | 16.34 | 15.85 |
| PBT-3% SO3Na, 1,730 poise | — | — | — | 50.46 | 48.95 |
| Glass Fiber | 30.00 | 30.00 | 30.00 | 30.00 | 30.00 |
| Hytrel | 5.00 | 5.00 | 3.00 | 3.00 | 5.00 |
| Irganox 1010 | 0.20 | 0.20 | 0.20 | 0.20 | 0.20 |
| Vis. @ low shear (Pa.-sec.) | 436 @ 52 $s^{-1}$ | 465 @ 53 $s^{-1}$ | 447 @ 53 $s^{-1}$ | 458 @ 53 $s^{-1}$ | 447 @ 53 $s^{-1}$ |
| Vis. @ high shear (Pa.-sec.) | 62 @ 10,114 $s^{-1}$ | 47 @ 10,780 $s^{-1}$ | 45 @ 10,881 $s^{-1}$ | 42 @ 11,132 $s^{-1}$ | 42 @ 11,006 $s^{-1}$ |
| Shear Sensitivity | 7.0 | 9.9 | 9.9 | 10.9 | 10.6 |
| MV (poise) | 8,359 | 7,748 | 7,617 | 7,628 | 7,487 |
| UNI (ft. lb./in.) | 15.1 | 16.4 | 14.4 | 15.9 | 15.4 |
| T.S. (psi) | 15,000 | 16,870 | 17,080 | 16,650 | 17,030 |
| F.M. (psi) | 836,700 | 885,900 | 955,200 | 955,300 | 923,100 |
| F.S. (psi) | 23,190 | 24,810 | 26,320 | 26,210 | 25,420 |
| HDT, 264 psi (C) | 190 | 189 | 190 | 185 | 184 |

TABLE IX

Properties of 30% glass-filled PBT-ionomers containing Kraton.

|  | R12 | E23 | E24 | E25 | E26 |
|---|---|---|---|---|---|
| PBT, 8500 poise | 32.80 | — | — | — | — |
| PBT, 700 poise | 32.00 | — | — | — | — |
| PBT-1.5% SO3Na, 7,647 poise | — | 14.63 | 15.083 | — | — |
| PBT-1.5% SO3Na, 1,783 poise | — | 50.17 | 51.72 | — | — |
| PBT-3% SO3Na, 7,507 poise | — | — | — | 16.34 | 15.85 |
| PBT-3% SO3Na, 1,730 poise | — | — | — | 50.46 | 48.95 |
| Glass Fiber | 30.00 | 30.00 | 30.00 | 30.00 | 30.00 |
| Kraton | 5.00 | 5.00 | 3.00 | 3.00 | 5.00 |
| Irganox 1010 | 0.20 | 0.20 | 0.20 | 0.20 | 0.20 |
| Vis. @ low shear (Pa.-sec.) | 468 @ 52 $s^{-1}$ | 475 @ 53 $s^{-1}$ | 478 @ 51 $s^{-1}$ | 471 @ 54 $s^{-1}$ | 480 @ 54 $s^{-1}$ |
| Vis. @ high shear (Pa.-sec.) | 69 @ 9,920 $s^{-1}$ | 45 @ 11,119 $s^{-1}$ | 46 @ 11,160 $s^{-1}$ | 43 @ 11,206 $s^{-1}$ | 43 @ 11,296 $s^{-1}$ |
| Shear Sensitivity* | 6.8 | 10.6 | 10.4 | 11.0 | 11.2 |
| MV (poise) | 9,876 | 9,395 | 8,931 | 8,938 | 9,771 |
| UNI (ft. lb./in.) | 16.2 | 15.9 | 15.5 | 15.4 | 16.0 |
| T.S. (psi) | 15,260 | 16,350 | 17,320 | 17,350 | 16,610 |
| F.M. (psi) | 862,100 | 894,700 | 956,000 | 949,400 | 904,300 |
| F.S. (psi) | 22,970 | 24,240 | 25,570 | 25,560 | 24,130 |
| HDT, 264 psi (C) | 189 | 189 | 191 | 183 | 181 |

TABLE X

Properties of 30% glass-filled PBT-ionomers containing MBS.

|  | R13 | E27 | E28 | E29 | E30 |
|---|---|---|---|---|---|
| PBT, 8500 poise | 32.80 | — | — | — | — |
| PBT, 700 poise | 32.00 | — | — | — | — |
| PBT-1.5% SO3Na, 7,647 poise | — | 14.63 | 15.083 | — | — |
| PBT-1.5% SO3Na, 1,783 poise | — | 50.17 | 51.72 | — | — |
| PBT-3% SO3Na, 7,507 poise | — | — | — | 16.34 | 15.85 |
| PBT-3% SO3Na, 1,730 poise | — | — | — | 50.46 | 48.95 |
| Glass Fiber | 30.00 | 30.00 | 30.00 | 30.00 | 30.00 |
| MBS | 5.00 | 5.00 | 3.00 | 3.00 | 5.00 |
| Irganox 1010 | 0.20 | 0.20 | 0.20 | 0.20 | 0.20 |
| Vis. @ low shear (Pa.-sec.) | 452 @ 52 $s^{-1}$ | 524 @ 51 $s^{-1}$ | 489 @ 52 $s^{-1}$ | 492 @ 51 $s^{-1}$ | 521 @ 52 $s^{-1}$ |
| Vis. @ high shear (Pa.-sec.) | 70 @ 9906 $s^{-1}$ | 50 @ 10870 $s^{-1}$ | 48 @ 11016 $s^{-1}$ | 43 @ 11361 $s^{-1}$ | 44 @ 11470 $s^{-1}$ |
| Shear Sensitivity* | 6.5 | 10.5 | 10.2 | 11.4 | 11.8 |
| MV (poise) | 10,294 | 10,958 | 9,717 | 9,171 | 10,830 |
| UNI (ft. lb./in.) | 15.5 | 15.8 | 15.9 | 14.8 | 15.5 |
| T.S. (psi) | 15530 | 16490 | 17210 | 16420 | 15880 |
| F.M. (psi) | 850200 | 904400 | 949100 | 935800 | 890400 |
| F.S. (psi) | 22840 | 24720 | 25990 | 24890 | 24110 |
| HDT, 264 psi (C) | 188 | 189 | 191 | 185 | 178 |

TABLE XI

Properties of flame retarded, 30% glass-filled PBT-ionomers.

|  | R14 | E31 |
|---|---|---|
| PBT, 8500 poise | 38.01 | — |
| PBT, 700 poise | 18.01 | — |
| PBT-3% SO3Na, 3,809 poise | 0 | 56.02 |
| Glass Fiber | 30.00 | 30.00 |
| FR Concentrate | 13.20 | 13.20 |
| PTFE | 0.58 | 0.58 |
| Irganox 1010 | 0.20 | 0.20 |
| Vis. @ low shear (Pa.-sec.) | 1,010 @ 56 $s^{-1}$ | 821 @ 59 $s^{-1}$ |
| Vis. @ high shear (Pa.-sec.) | 106 @ 9,485 $s^{-1}$ | 45 @ 11946 $s^{-1}$ |
| Shear Sensitivity | 9.5 | 18.2 |
| MV (poise) | 16,086 | 16,300 |
| Spiral Flow @ 30 mil(in.) | 3.375 | 4.00 |
| UNI (ft. lb./in.) | 14.7 | 12.4 |
| T.S. (psi) | 15,340 | 15,200 |
| F.M. (psi) | 25,570 | 24,530 |
| F.S. (psi) | 980,600 | 1,020,00 |
| HDT, 264 psi (C) | 191 | 191 |

TABLE XII

Properties of glass and mineral filled PBT-ionomers.

|  | R15 | E32 |
|---|---|---|
| PBT, 8500 poise | 40.57 | — |
| PBT, 700 poise | 19.23 | — |
| PBT-3% SO3Na, 3,809 poise | — | 59.8 |
| Glass Fiber | 20.00 | 20.00 |
| Mica | 20.00 | 20.00 |
| Irganox 1010 | 0.20 | 0.20 |
| Vis. @ low shear (Pa.-sec.) | 793 @ 54 $s^{-1}$ | 741 @ 56 $s^{-1}$ |
| Vis. @ high shear (Pa.-sec.) | 99 @ 9881 $s^{-1}$ | 57 @ 11186 $s^{-1}$ |
| Shear Sensitivity* | 8.0 | 13.0 |
| MV (poise) | 14294 | 14607 |
| Spiral Flow @ 30 mil(in.) | 3.25 | 4.25 |
| UNI (ft.lb./in.) | 6.8 | 5.3 |
| T.S. (psi) | 14,310 | 14,550 |
| F.M. (psi) | 960,300 | 1,072,500 |
| F.S. (psi) | 20,420 | 21,410 |
| HDT, 264 psi (C) | 195 | 192 |

TABLE XIII

Properties of 30% glass-filled PBT/PBT-ionomer blends.

|  | R16 | E33 | R17 | E34 |
|---|---|---|---|---|
| Extrusion # | A13735-1 | A13735-2 | A13735-6 | A13735-5 |
| PBT, 8500 poise | 54.72 | 27.36 | 31.11 | — |
| PBT, 700 poise | 14.98 | 7.49 | 38.59 | 34.85 |
| PBT-3% SO3Na, 6,020 poise | — | 34.85 | — | 34.85 |
| Glass Fiber OCF 183F | 30.00 | 30.00 | 30.00 | 30.00 |
| PEPQ | 0.15 | 0.15 | 0.15 | 0.15 |
| Irganox 1076 | 0.15 | 0.15 | 0.15 | 0.15 |
| Vis. @ low shear (Pa.-sec.) | 837 @ 54.5 $s^{-1}$ | 842 @ 56 $s^{-1}$ | 510 @ 56 $s^{-1}$ | 491 @ 58 $s^{-1}$ |
| Vis. @ high shear (Pa.-sec.) | 105 @ 9,720 $s^{-1}$ | 72 @ 10,580 $s^{-1}$ | 61 @ 10,088 $s^{-1}$ | 48 @ 10,480 $s^{-1}$ |
| Shear Sensitivity | 8.0 | 11.7 | 8.4 | 10.2 |
| MV (poise) | 13,719 | 13,580 | 6,846 | 6,317 |
| UNI (ft.lb./in.) | 14.4 | 14.7 | 13.0 | 12.0 |
| T.S. (psi) | 17,360 | 17,870 | 18,590 | 19,800 |

TABLE XIII-continued

Properties of 30% glass-filled PBT/PBT-ionomer blends.

|  | R16 | E33 | R17 | E34 |
|---|---|---|---|---|
| F.M. (psi) | 970,100 | 982,900 | 970,700 | 1,072,250 |
| F.S. (psi) | 25,790 | 26,040 | 25,960 | 29,510 |
| HDT, 264 psi (C) | 194 | 191 | 199 | 199 |
| HDT, 66 psi (C) | 218 | 215 | 218 | 216 |

What is claimed is:

1. A thermoplastic resin composition having enhanced shear sensitivity consisting of
   (a) from 50 to 97 percent by weight of a shear enhancing alkylene aryl polyester copolymers having metal sulfonate units represented by the formula IA:

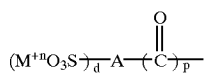

or the formula IB:

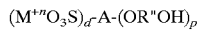

where $p=1-3$, $d=1-3$, $p+d=2-6$, $n=1-5$, M is a metal, and A is an aryl group containing one or more aromatic rings where the sulfonate substituent is directly attached to an aryl ring, R" is a divalent alkyl group and the metal sulfonate group is bound to the polyester through ester linkages;
   (b) from 3% to about 50% by weight of a glass fiber filler to reinforce and stiffen the composition and form a reinforced molding composition.

2. A thermoplastic resin composition of claim 1 where the metal sulfonate polyester copolymer (a) has the formula IV:

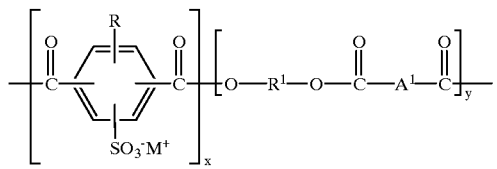

where the ionomer units, x, are from 0.1–50 mole %, R is halogen, alkyl, aryl, alkylaryl or hydrogen, $R^1$ is derived from a diol reactant comprising straight chain, branched, or cycloaliphatic alkane diols and containing from 2 to 12 carbon atoms, and $A^1$ is a divalent aryl radical.

3. A thermoplastic resin composition of claim 2 wherein R is hydrogen, x=0.5–10 mole percent, $R^1$ is $C_2$–$C_8$ alkyl, and $A^1$ is derived from iso- or terephthalic acid or a mixture of the two.

4. A thermoplastic resin composition according to claim 3 where p=2, d=1, and M is zinc, tin, alkaline or alkaline earth metal.

5. A thermoplastic resin composition of claim 3 wherein the metal sulfonate polyester of formula IV is a alkylene polyester wherein $A^1$ is the residue from a diacid component of iso or tere phthalic acid, and ester forming derivatives thereof and $R^1$ is the residue from a diol component selected from the group consisting essentially of ethylene glycol, propanediol, butanediol, or cyclohexanedimethanol, and mixtures thereof.

6. A thermoplastic resin composition of claim 2 where the metal sulfonate salt is iso- or tere-sulfo phthalate.

7. A thermoplastic resin composition of claim 2 wherein x is from about 1 to about 20 percent.

8. A thermoplastic resin composition of claim 7 comprising from 10 to 40 weight percent fibrous glass.

9. A thermoplastic resin composition of claim 8 having a shear sensitivity as measured using a Goettfert rheometer to determine shear rate profiles at 250° C. quantifying shear sensitivity as the ratio of the viscosity measured at a low shear rate (~50s$^{-1}$) to the viscosity measured at a high shear rate (~11,000s$^{-1}$) wherein materials having higher ratios are more shear sensitive, said resin having higher shear sensitivity than analogous materials in which the metal sulfonate copolyester polymer is replaced by an analogous polyester with no metal sulfonate groups.

10. A thermoplastic resin composition of claim 2 wherein x is from about 3 to about 12 percent.

11. A thermoplastic resin composition of claim 10 comprising from 10 to 40 weight percent fibrous glass.

12. A thermoplastic resin composition of claim 11 wherein said resin has a 20 percent higher shear sensitivity than analogous materials in which the metal sulfonate copolyester polymer is replaced by an analogous polyester with no metal sulfonate groups.

13. A thermoplastic resin composition of claim 6 wherein the ionomer units, x, are from about 3 to about 12 mole percent of the polymer.

14. A thermoplastic resin composition of claim 13 comprising from 10 to 40 weight percent fibrous glass.

15. A thermoplastic resin composition of claim 14 wherein said resin has a 20 percent higher shear sensitivity than analogous materials in which the metal sulfonate copolyester polymer is replaced by an analogous polyester with no metal sulfonate groups.

16. A thermoplastic resin composition wherein said resin composition consists of the composition of claim 9 and from about 1 to about 30 percent by weight of a halogenated flame retardant.

17. A thermoplastic resin composition wherein said resin composition consists of the composition of claim 9 and an impact modifier in an amount from about 1 to about 25% by weight.

18. A thermoplastic resin composition of claim 17 wherein said impact modifier comprises a rubbery impact modifier.

19. A thermoplastic resin composition of claim 17 wherein said impact modifier comprises an olefin containing polymer and copolymer.

20. A thermoplastic resin composition of claim 17 wherein said impact modifier comprises a styrene containing polymer.

* * * * *